United States Patent [19]

Lipe

[11] Patent Number: 5,640,507
[45] Date of Patent: Jun. 17, 1997

[54] METHOD AND APPARATUS FOR IDENTIFYING READ ONLY MEMORY

[75] Inventor: Ralph Lipe, Kirkland, Wash.

[73] Assignee: Microsoft Corporation, Redmond, Wash.

[21] Appl. No.: 844,239

[22] Filed: Mar. 2, 1992

[51] Int. Cl.⁶ .................................................. G06F 11/22
[52] U.S. Cl. ........................ 395/183.01; 395/183.16; 395/183.18; 395/183.21; 395/185.01; 395/185.02
[58] Field of Search .................................. 371/21.1, 67.1; 395/183.01, 183.16, 183.18, 183.21, 185.01, 185.02

[56] References Cited

U.S. PATENT DOCUMENTS

| | | | |
|---|---|---|---|
| 4,455,654 | 6/1984 | Bhaskar et al. | 371/20 |
| 4,876,684 | 10/1989 | Guntheroth | 371/21.2 |
| 5,091,908 | 2/1992 | Zorian | 371/21.5 |
| 5,237,669 | 8/1993 | Spear et al. | 395/400 |

*Primary Examiner*—Kevin A. Kriess
*Assistant Examiner*—Kakali Chaki
*Attorney, Agent, or Firm*—Seed and Berry, LLP

[57] ABSTRACT

A method is disclosed for identifying ROM memories. The method first determines whether the same data is read from a predetermined unit of memory during successive reads and, if so, determines whether the read data includes more than a predetermined minimum number of different data bytes. If both tests are true, then the predetermined unit of memory is considered to be occupied by read only memory. If either test fails, then the predetermined unit of memory is considered to be unoccupied.

5 Claims, 4 Drawing Sheets

METHOD AND APPARATUS FOR IDENTIFYING READ ONLY MEMORY

FIELD OF THE INVENTION

The subject invention is directed toward a method for identifying read only memory (ROM) and, more particularly, toward a method for locating read only memory without relying upon the memory containing a predetermined signature.

BACKGROUND OF THE INVENTION

Conventional computer architecture, and particularly personal computers (PCs), include a central processing device capable of addressing a predetermined range of memory. This predetermined range of memory is typically referred to as the address space of the central processor. Any devices that are to be addressed by the central processor must respond to an address located within the central processor's address space.

Usually, the address space of a central processor is divided, or partitioned, into two portions. A first portion, sometimes referred to as the main memory block, is used to accommodate random access memory (RAM) of the central processor for temporary storage of data and instructions. A second portion, sometimes referred to as the adapter region or the upper memory block, is used to accommodate various other memory and hardware devices such as read only memory (ROM), video adapters, disk drives, etc. As used herein, and in the art, a particular device is located in the main memory block if the device is responsive to an address falling within the range of addresses for the main memory block and is located in the upper memory block if the device is responsive to an address falling within the range of addresses for the upper memory block. Similarly, a portion of the address space of the central processor is occupied if a device is located in that portion of the address space.

Many central processors include conventional microprocessors wherein the microprocessor, and therefore the central processor, has a 1 megabyte address space. In these devices, 640K of the 1 megabyte range is allocated to the main memory block and is dedicated to random access memory (RAM) for use by the microprocessor for selective storage of data and instructions. The remaining 360K of the 1 megabyte range is allocated to the upper memory block and is used to accommodate other devices to be used with the microprocessor.

To gain full advantage of the entire address space of a central processor, it is often desirable to map random access memory, normally located in the main memory block, into the upper memory block. Conventional programs are available for mapping random access memory into the upper memory block of a central processor. Also, newer processors, such as the Intel 386 and 486 processors, include a paging mode that automatically maps a page of random access memory into the upper memory block, wherein a page of memory is simply a predetermined unit of memory referred to herein as a memory unit.

However, for the central processor to map random access memory into unoccupied regions of the upper memory block, the central processor must first identify which regions are not occupied by devices and/or memory. Conventionally, this is performed by searching each memory location of each memory unit of the adapter region for a predetermined data word, referred to as a signature. The data word, or signature, identifies the memory unit in which it is found as being occupied by a device or read only memory. However, the upper memory block of the central processor's address space is often occupied by read only memory devices that have no signature. This prevents conventional central processors from locating these devices and, therefore, may result in a device being mapped to an occupied portion of the upper memory block. Such mapping can cause the computer system to crash or may cause unstable performance. Accordingly, it is desirable to provide a method for identifying occupied memory units of a central processor's address space, without relying upon the presence of a predetermined data word, or signature, in the occupied memory units.

SUMMARY OF THE INVENTION

The subject invention addresses the foregoing inadequacies of the prior art by providing various methods and apparatus for determining whether a portion of address space of a computer system is occupied by read only memory. In one embodiment, the method comprises the step of reading the bytes of the portion of the address space and comparing the values of the bytes read to one another to determine how many different values are read from the portion of the address space and, if the number of different values exceeds a predetermined minimum value, then identifying the portion of the address space as being occupied by read only memory.

In an alternative embodiment of the invention, the additional step of reading the bytes of the portion of the address space at least first and second times to determine whether the same data is read from the bytes both the first and second time is also performed. If the same data is read, then the portion of the address space is identified as being occupied by read only memory.

DETAILED DESCRIPTION OF THE INVENTION

The present invention is a method and apparatus for identifying unoccupied portions of a central processor's address space, without relying upon a signature stored in occupied portions of the address space. More particularly, the present invention provides method and apparatus for identifying the location of read only memory (ROM) in the address space of a central processor. Those skilled in the art will appreciate that devices located in the upper memory block of the address space of a central processor are typically accessed through read only memory devices that respond to addresses in this region. Accordingly, to identify occupied portions of the upper memory block, a presently preferred embodiment of the subject method "looks" for read only memory. Specifically, the subject method identifies unoccupied memory units as those memory units that do not "look" like read only memory.

Figure 1:
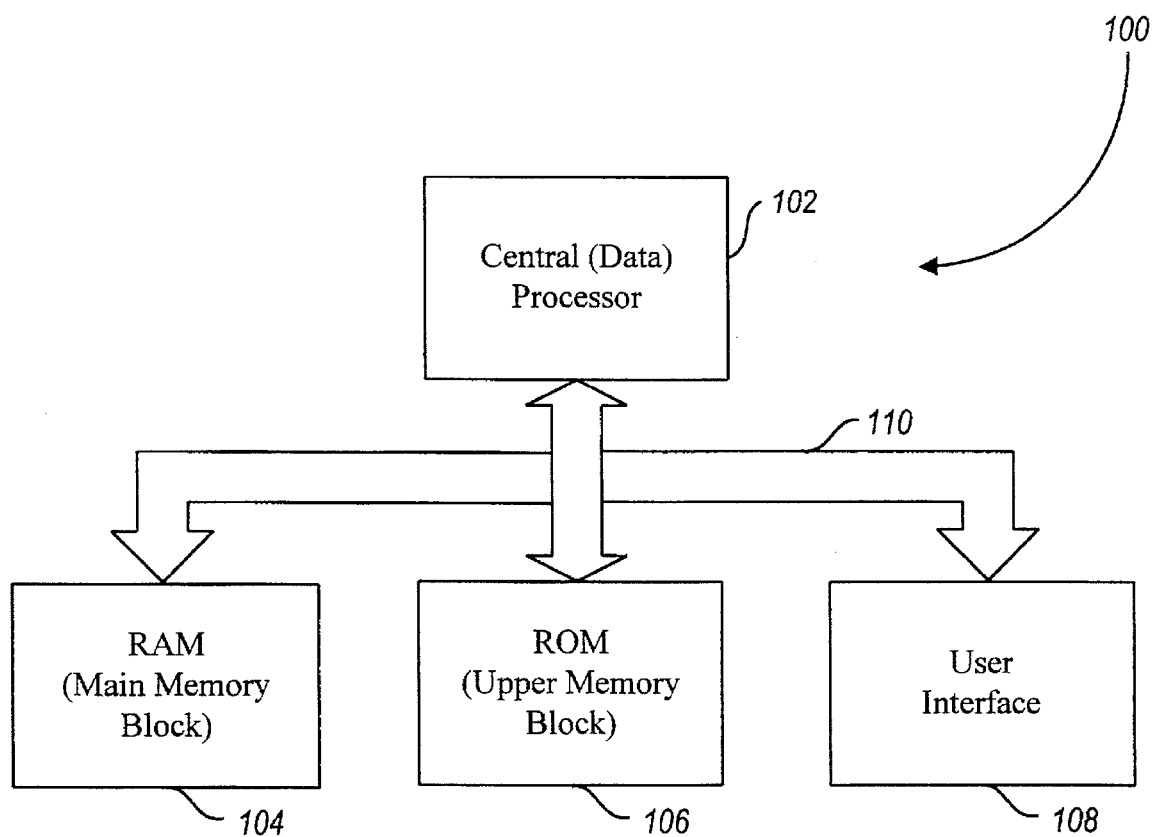
FIG. 1 is an illustrative block diagram of a central processor for use with a presently preferred embodiment of the invention.

A data processing system 100 for use with a presently preferred embodiment of the subject invention is illustrated in FIG. 1. Therein, the data processing system 100 includes a central processor 102 coupled for data communication with random access memory 104, read only memory and devices 106, and a user interface 108 over a system bus 110. The central processor 102 may comprise any conventional data processor such as, for example, a microprocessor, and any devices required for interfacing the central processor with the system bus 110. The random access memory 104 may comprise any conventional memory device for selectively storing data and instructions for use by the central processor 102. As used herein, the random access memory 104 is that memory that occupies the main memory block of the central processor's address space.

The read only memory and devices 106 are typically device drivers that are stored in read only memory for interfacing the central processor 102 with a peripheral device. The read only memory and devices 106 occupy the upper memory block of the central data processor 102. Although one read only memory and devices 106 is illustrated in FIG. 1, those skilled in the art will appreciate that several read only memory and devices 106 may be coupled to the system bus 110 for occupying one or more memory units of the upper memory block. Also, those skilled in the art will appreciate that the read only memory and devices 106 do not occupy the entire upper memory block but may instead be comprised of several devices, each of which occupies a portion of the upper memory block, and the total of which does not occupy all of the upper memory block. The read only memory and devices 106 may comprise a plurality of conventional devices commonly used with a data processing system such as disk drives, modems, etc.

The user interface 108 may comprise any device, or combination of devices, for interfacing a user with the system bus 110 and, therefore, with the central processor 102. As an example, the interface 108 may comprise a standard keyboard, a computer display, and a mouse. Those skilled in the art will appreciate that the user interface 108 will also have device driver read only memory located in the upper memory block of the address space of the central processor 102.

The system bus 110 comprises a plurality of parallel electrical connectors for transmitting a plurality of parallel digital signals, commonly referred to as data bytes, data words, etc., between the devices connected to the system bus. As is known in the art, the system bus 110 may be divided into a data bus portion, an address bus portion, and a control bus portion for transmitting data, address, and control signals, respectively, wherein each of the data, address and control signals includes a plurality of discrete electrical connections referred to herein, and in the art, as bits or data bits.

Figure 2A:
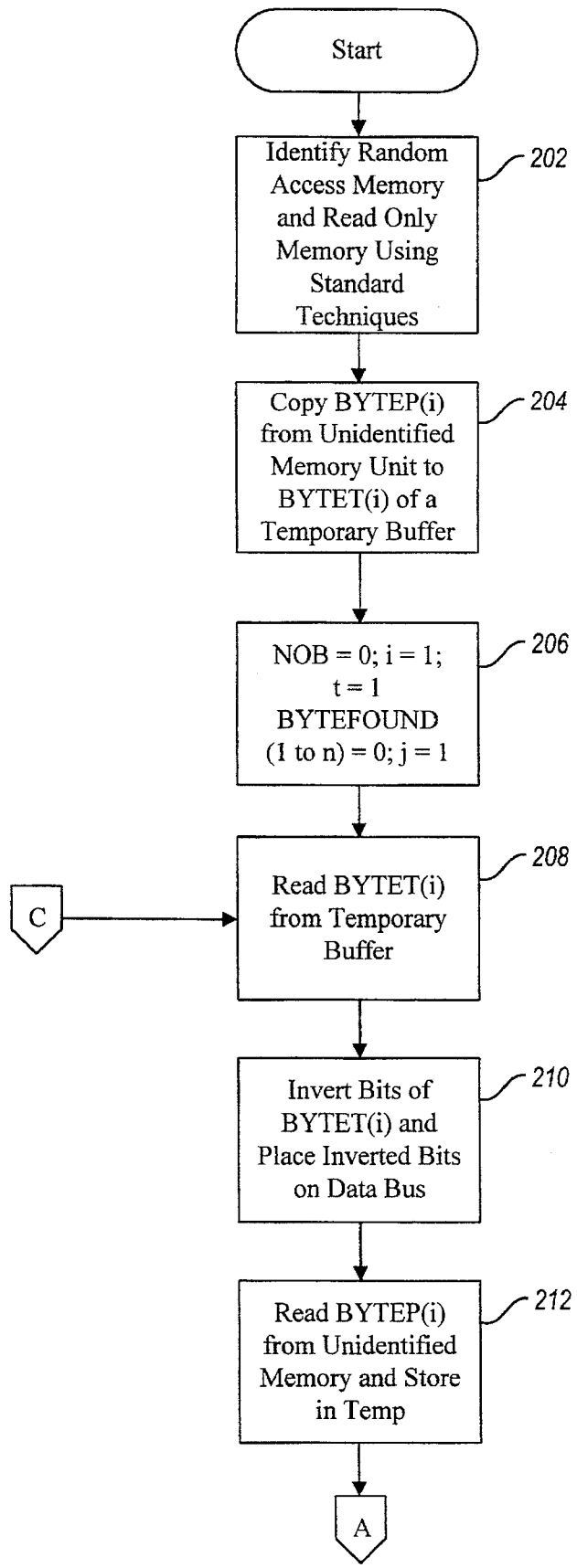
FIGS. 2A, 2B, and 2C are decision flow diagrams illustrating a presently preferred embodiment of the method that is the subject of the present invention.
Figure 2B:
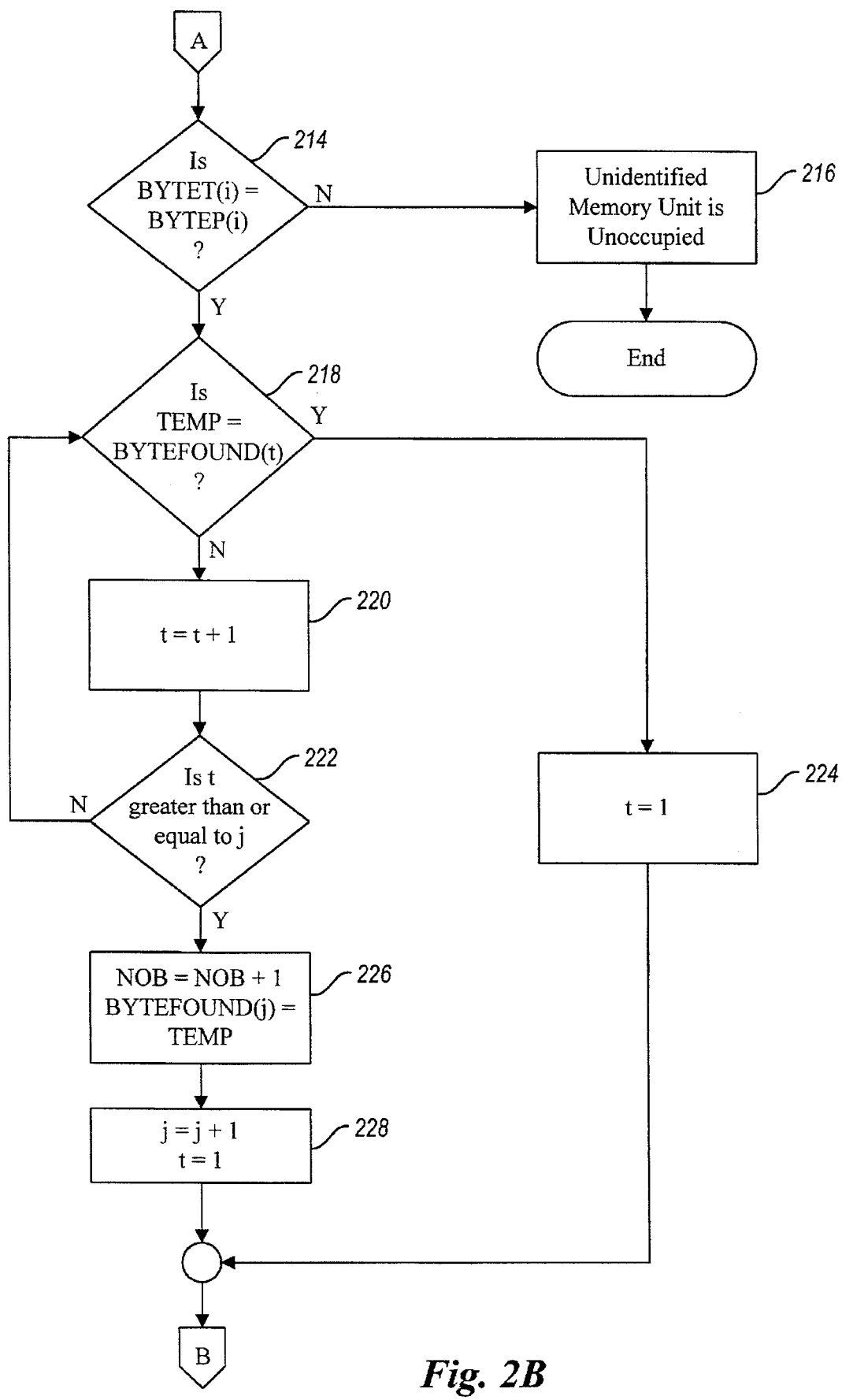
Figure 2C:
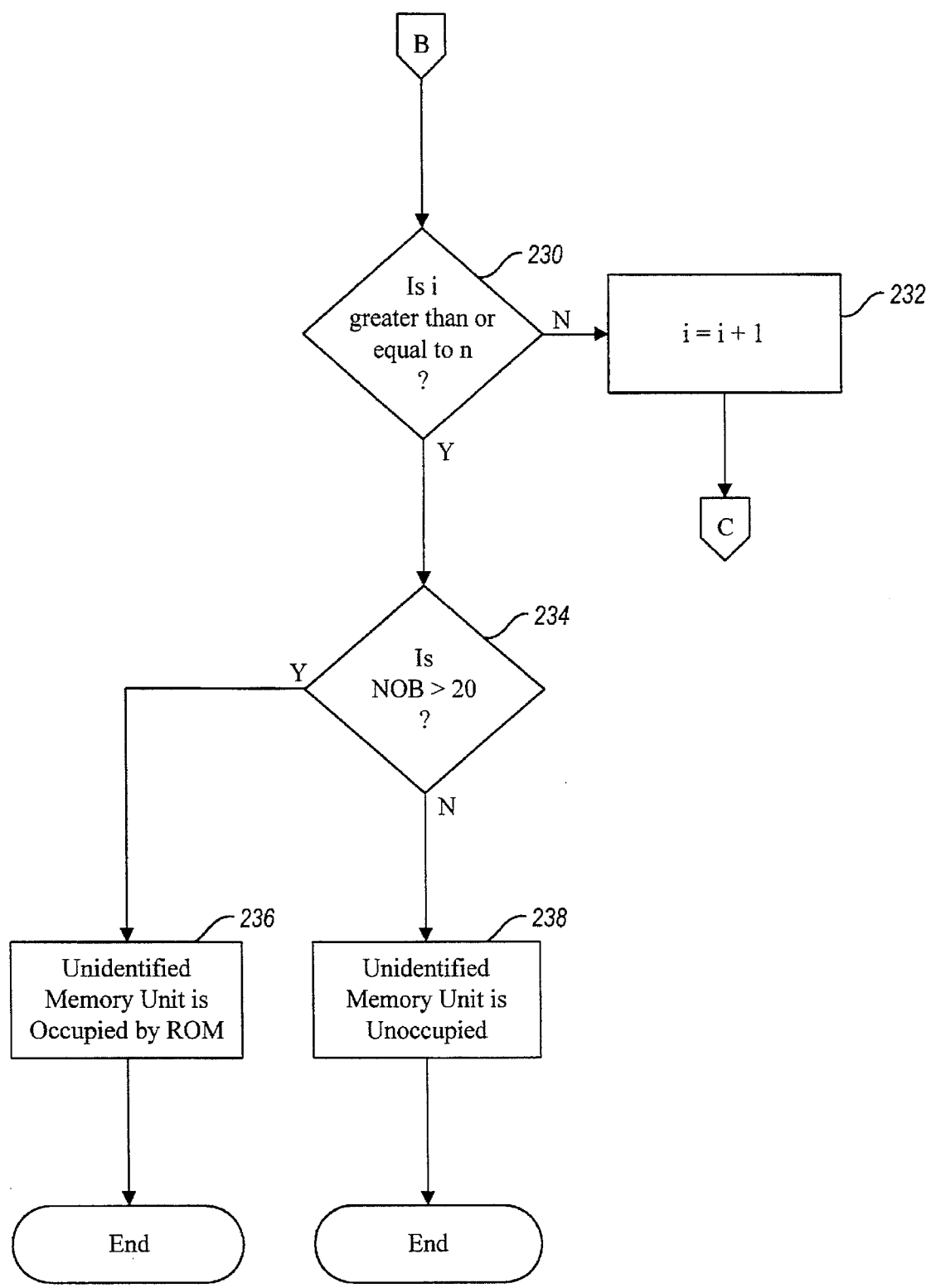

In accordance with a presently preferred embodiment of the invention, the central processor 102 performs the method illustrated in the decision flow diagram of FIGS. 2A, 2B, and 2C, to identify portions of the upper memory block that are not occupied. In accordance with the method illustrated in FIG. 2A, the central processor 102 will first identify the random access memory 104, the read only memory and devices 106 and the user interface 108 using standard techniques, step 202. Several standard techniques for identifying the random access memory 104, the read only memory 106, and the user interface 108 are known in the art. As examples, random access memory is typically identified by writing a predetermined data word to a particular address of a memory unit and, thereafter, reading the data stored in the address. If the predetermined data word is read from the particular address, then the memory unit is occupied by random access memory. However, if data other than that written to the address is read back, then the memory unit is not occupied by random access memory.

Conventional methods for identifying read only memory comprise searching each address location of a memory unit of address space for a predetermined signature. If the signature is read from any address of the memory unit, then the memory unit of address space is occupied by read only memory. Otherwise, the memory unit is not believed to be occupied by read only memory. Use of the above-noted methods will be sufficient to identify a portion of the random access memory and read only memory located in the address space of the central processor 102. Other conventional methods may be substituted for those discussed above for identifying the random access memory 104, read only memory 106, and the user interface 108.

Those skilled in the art will appreciate, however, that the above-noted methods will not identify read only memory that does not include a signature. Accordingly, another method should be employed to insure that all read only memory has been located. The method of the subject invention relies upon the observation that unoccupied memory space will not always place the same data on the system bus 110 and upon the observation that unoccupied memory space typically places very similar noise signals on the system bus 110. Accordingly, the method of the subject invention attempts to determine, first, whether the same data can be read out of each address location of a memory unit during successive reads and, second, whether the data contained in the address locations of the memory unit is the same for each address location or, whether a minimum number of distinct data bytes are stored in the address locations of the memory unit.

To this end, after the conventional methods have been utilized for identifying the random access memory 104, the read only memory and devices 106, and the user interface 108 in the address space of the central processor 106, step 202, each memory unit of the address space that has not been identified as being occupied is examined. In a presently preferred embodiment of the invention, each memory unit is selected to be four thousand (4K) memory addresses. However, those skilled in the art will appreciate that other memory units may be easily substituted therefor. A predetermined number of memory locations BYTEP(i), corresponding to that contained in a memory unit, are read into a temporary buffer memory, BYTET(i), step 204. As is known in the art, the temporary buffer memory may comprise a portion of the random access memory 104 located in the main memory block of the address space.

After the data stored in the memory unit is copied into the temporary buffer memory, a number of variables are initialized, step 206. Particularly, a variable, NOB, that records the number of distinct data bytes stored in the memory unit is set equal to zero. Three index variables, i, t, and j are set equal to one. And an array of data bytes, BYTEFOUND(n), is set equal to zero. Thereafter, the first address of the memory unit is read from the temporary buffer memory, BYTET(i), step 208, and inverted, step 210. The purpose of the inversion is to ensure that each data bit of the data bus portion of the system bus 110 is inverted with respect to the data that was previously obtained and stored in the temporary buffer memory. Accordingly, if the unidentified memory location is read only memory, containing the data previously stored in the temporary buffer, then it will be capable of driving each data bit of the data portion of the system bus 110 to the opposite state. The inversion of step 210 ensures that this is done.

The first byte of data is again read from the first address location of the memory unit and stored in a temporary memory location, step 212. The temporary memory location may also comprise a portion of the random access memory 104. Thereafter, the data stored in the first address space of the temporary buffer memory, BYTET(i), is compared to the data read from the first address location of the memory unit, BYTEP(i), step 214 (FIG. 2B), and if they are not equal, the memory unit is considered unoccupied, step 216, and the method continues with the next unidentified memory unit.

Those skilled in the art will recognize that steps 208–216 are intended to determine whether a particular address location will provide the same data during successive reads. If the memory unit is occupied by read only memory, then the same data will be returned during successive reads. Therefore, if the same data is not provided during successive reads, then the memory unit is assumed unoccupied. To further ensure that the memory location is supplying the same data during successive reads, the data read first is inverted and placed on the system bus 110 thereby forcing the data read during the subsequent access to positively drive the system bus 110 to the proper state. As an alternative, those skilled in the art will appreciate that each memory location can be examined independently or, that a minimum number of memory locations can be required before the memory unit is assumed unoccupied.

If the first address location provides data that is the same as that stored in the associated address location of the temporary buffer memory, then the method attempts to determine how many different data bytes are provided by the plurality of address locations in the unit of memory. To this end, the data byte previously stored in the temporary buffer TEMP, step 212, is compared to a byte of data previously found, BYTEFOUND(t), step 218. As discussed above, an array of BYTEFOUND data bytes 1-n were previously set to zero, step 206. If the data located in the temporary location, TEMP, is not the same as the first byte found, BYTEFOUND (i), step 218, then the index variable t is incremented, step 220 and the index variable t compared to the index variable j, step 222. The index variable j is used to record one more than the number of different data bytes found in the unit of memory being examined. If the index variable t is not greater than or equal to the index variable j, then the data byte presently being examined, i.e., TEMP, must be compared to other bytes previously found, i.e., other BYTEFOUND(t), and steps 218–222 are repeated until the data byte TEMP being examined has been compared to each byte of data previously found, i.e., until t is greater than or equal to j.

If the data being examined, TEMP, is the same as a byte of data previously found, BYTEFOUND(t), step 218, then the index variable t is returned to its value of 1, step 224, and the method proceeds to step 230. However, if the byte, TEMP, being examined is not the same as any byte previously found, BYTEFOUND(D, then the number of bytes found, NOB, is incremented by 1, step 226, and the byte being examined TEMP is stored as the new byte found, BYTEFOUND(j). Next, the variable j is incremented by 1 to indicate that a new byte has been found and the index variable t is set equal to 1, step 228. Thereafter, the index variable i is compared to the index variable n to determine whether each byte of data in the predetermined unit has been examined, step 230. If not, then the index variable i is incremented by 1 and the next byte of data from the predetermined unit of memory is examined, step 208.

If, however, each byte of memory in the memory unit has been examined, then the number of bytes found, NOB, is compared to a predetermined minimum number, step 234. Comparison of the number of bytes found, NOB, to the minimum number is used as the second method of determining whether read only memory is located in the memory unit being examined. If the number of different bytes of data found in the unit of memory exceeds 20, then the predetermined unit of memory is considered to be occupied by read only memory, step 236. If, however, the number of different bytes found is less than or equal to 20, then the unit of memory being examined is considered to be unoccupied, step 238. Those skilled in the art will appreciate that although a predetermined minimum number of different bits is selected herein as 20, other numbers may be readily substituted therefor.

It will be apparent to those skilled in the art that although only several presently preferred embodiments of the invention have been described in detail herein, many modifications and variations may be provided without departing from the true scope and spirit of the invention. Accordingly, the invention is not limited except as by the appended claims.

I claim:

1. A method for determining whether a group of memory devices in a computer system that each store bytes corresponding to a range of addresses contains a read only memory (ROM) device that stores bytes corresponding to a selected range of addresses, said method comprising the steps of:

(a) reading the stored bytes corresponding to the selected range of addresses a first time and a second time to determine whether the same data is read from the bytes both the first time and the second time and, if so, determining that the group of memory devices contains a read only memory (ROM) device that stores bytes corresponding to the selected range of addresses; and (b) comparing the values of the bytes read to one another to determine how many different values are read that correspond to the selected range of addresses and, if the number of different values exceeds a predetermined minimum value, determining that the group of memory devices contains a read only memory (ROM) device that stores bytes corresponding to the selected range of addresses, wherein the predetermined minimum value is twenty.

2. An apparatus for identifying the address location of ROM memory coupled to a system bus wherein the system bus includes a data portion and an address portion, the data portion providing data signals that, when address signals placed on the address portion correspond to a valid memory address, correspond to data stored at that memory address, said apparatus comprising:

data processor means responsive to program instructions for performing specified functions, said data processor means including means for generating address signals, said data processor means being coupled to the system bus for transmitting and receiving address and data signals therebetween;

first memory means for storing a plurality of first instructions, said data processor means being responsive to said first plurality of instructions for sequentially placing a plurality of address signals on the address portion of the system bus at least first and second times and determining whether the data provided on the data portion is the same both the first and second time and, if all of the data signals appearing the second time are the same as the corresponding data signals appearing the first time, providing a ROM signal in a first state; and second memory means for storing a plurality of second instructions, said data processor means being responsive to said plurality of second instructions for placing said plurality of addresses on the address portion of the system bus to determine whether a predetermined number of distinct data values are provided on the data portion and, if the number of distinct data values exceeds the predetermined number and if the ROM signal is in the first state then identifying said portion of said address space as ROM memory, said apparatus further comprising means for inverting the data signals appearing on the data portion of the system bus the first time, said data processor means being constructed to place the inverted data signals on the data portion of the system bus before placing the plurality of addresses on the address portion the second time.

3. A method for determining whether a memory block of a computer system is occupied by read only memory (ROM), said method comprising the step of reading the bytes of the memory block and comparing the values of the bytes read to one another to determine how many different values are read from the memory block and, if the number of different values exceeds a predetermined minimum value, indicating that the memory block is occupied by read only memory (ROM), wherein the computer system includes a data bus and wherein the step of reading the bytes from the memory block at least first and second times to determine whether the same data read from the bytes both the first and second time comprises the substeps of:

storing the values read from the bytes during the first read so that each stored value corresponds to a byte of data in the portion of the memory block;

inverting the bits of a particular stored value and placing the inverted bit value on the data bus of the computer system; and reading the bytes of the memory block that correspond to the particular stored value after the inverted bit value is placed on the data bus and comparing the read bytes to the corresponding stored value.

4. A method for determining whether a range of memory addresses in a computer system is unoccupied, the computer system having a data bus, the method comprising the steps of:

for each of at least a portion of the memory addresses in the range:

reading the contents of the memory address a first time, placing the inverse of the result from reading the contents of the memory address a first time on the data bus, and after the placing step, reading the contents of the memory address a second time; and if the steps of reading the contents of the memory address a first time and reading the contents of the memory address a second time produce different results for more than a predetermined maximum number of the memory addresses, indicating that the range of memory is unoccupied.

5. A method for determining whether a memory block of a computer system is occupied by read only memory (ROM), occupied by random access memory (RAM), or unoccupied, the memory block comprised of memory locations, the computer system including a data bus, the method comprising the steps of:

reading the memory block to determine whether the memory block includes a signature identifying the memory block as being occupied by read only memory (ROM), and, if so, indicating that the memory block is occupied by read only memory (ROM);

if the memory block does not include a signature identifying the memory block as being occupied by read only memory (ROM), writing test information to at least a portion of the memory block and reading from the written-to portion of the memory block to determine whether the written-to portion of the memory block contains the test information, and, if so, indicating that the memory block is occupied by random access memory (RAM);

if the written-to portion of the memory block does not contain the test information, for each of at least a portion of the memory locations in the memory block:

reading the contents of the memory location a first time, placing the inverse of the result from reading the contents of the memory location a first time on the data bus, and after the placing step, reading the contents of the memory location a second time;

if the steps of reading the contents of the memory location a first time and reading the contents of the memory location a second time produce different results for more than a predetermined maximum number of the memory locations, indicating that the memory block is unoccupied;

if the steps of reading the contents of the memory location a first time and reading the contents of the memory location a second time do not produce different results for more than the predetermined maximum number of the memory locations, reading the information stored in each of at least a portion of the memory locations in the memory block, counting the number of different results produced by reading the information stored in each of at least a portion of the memory locations in the memory block, and, if the number of different results exceeds a predetermined number of different results, indicating that the memory block is unoccupied; and if the number of different results does not exceed a predetermined number of different results, indicating that the memory block is unoccupied.

* * * * *